(12) United States Patent
Minakawa et al.

(10) Patent No.: US 7,619,836 B2
(45) Date of Patent: *Nov. 17, 2009

(54) IMAGING LENS UNIT

(75) Inventors: Yoshiaki Minakawa, Ibaraki (JP); Yasuyuki Sugi, Ibaraki (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/232,801

(22) Filed: Sep. 24, 2008

(65) Prior Publication Data

US 2009/0040630 A1 Feb. 12, 2009

Related U.S. Application Data

(62) Division of application No. 11/729,826, filed on Mar. 30, 2007, now Pat. No. 7,446,958.

(30) Foreign Application Priority Data

Mar. 31, 2006 (JP) ............................. 2006-100836

(51) Int. Cl.
*G02B 9/06* (2006.01)
*G02B 9/04* (2006.01)
*G11B 7/00* (2006.01)

(52) U.S. Cl. ................... 359/794; 359/793; 369/112.23

(58) Field of Classification Search ................. 359/719, 359/793, 794, 795; 369/112.23
See application file for complete search history.

(56) References Cited

U.S. PATENT DOCUMENTS

| 6,888,686 | B2 | 5/2005 | Do |
| 6,992,841 | B2 | 1/2006 | Saito et al. |
| 7,206,144 | B2 | 4/2007 | Tamura |
| 7,236,315 | B2 | 6/2007 | Chen et al. |
| 7,446,958 | B2 * | 11/2008 | Minakawa et al. .......... 359/794 |
| 2009/0153983 | A1 * | 6/2009 | Nakanishi et al. ........... 359/718 |

FOREIGN PATENT DOCUMENTS

JP   A-2003-232990   8/2003

* cited by examiner

*Primary Examiner*—David N Spector
(74) *Attorney, Agent, or Firm*—Oliff & Berridge, PLC

(57) ABSTRACT

An imaging lens unit comprising, in order from the object side, a first lens having a meniscus shape with its convex surface on the object side, an aperture stop and a second lens having a meniscus shape with its convex surface on the image side. A maximal value of a tangent angle within a range of a lens surface effective diameter of the surface on the object side of the first lens is 70 to 90 degrees. A maximal value of a tangent angle within a range of a lens surface effective diameter of the surface on the image side of the second lens is 70 to 90 degrees.

24 Claims, 7 Drawing Sheets

| SURFACE NUMBER | CURVATURE RADIUS (mm) | SURFACE INTERVAL (mm) | REFRACTIVE INDEX | ABBE NUMBER |
|---|---|---|---|---|
| 1 | 0.919 | 0.84 | 1.535 | 56.0 |
| 2 | 1.46 | 0.10 | | |
| APERTURE STOP | ∞ | 0.28 | | |
| 4 | -1.605 | 1.95 | 1.535 | 56.0 |
| 5 | -1.747 | 0.80 | | |
| 6 | ∞ | 0.30 | 1.517 | 64.0 |
| 7 | ∞ | 0.46 | | |

Fig. 4

|  | 1st SURFACE | 2nd SURFACE | 4th SURFACE | 5th SURFACE |
|---|---|---|---|---|
| k | 0.19927 | 7.48719 | 0.09877 | 0.30309 |
| A4 | -5.87138E-02 | 1.02635E-03 | -4.23816E-01 | 1.67343E-02 |
| A6 | 4.37203E-01 | -1.56678E-01 | 2.85788E+00 | -6.30139E-02 |
| A8 | -2.52601E+00 | -1.05578E+01 | -3.09680E+01 | 9.02256E-02 |
| A10 | 8.54503E+00 | 6.88410E+01 | 1.41694E+02 | -7.93922E-02 |
| A12 | -1.74019E+01 | -1.86608E+02 | -2.69339E+02 | 4.14486E-02 |
| A14 | 1.92656E+01 | -3.02071E+01 | -1.10229E+02 | -1.17806E-02 |
| A16 | -8.98763E+00 | 2.82331E+02 | 7.02777E+02 | 1.37678E-03 |

Fig. 5

| | |
|---|---|
| FOCAL LENGTH (mm) | 3.83 |
| F-NUMBER | 3.0 |
| OPTICAL LENGTH (mm) | 4.73 |
| BACK FOCUS (mm) | 1.56 |
| DIAGONAL ANGLE OF VIEW (DEGREE) | 60.9 |
| AOI TO SENSOR (DEGREE) | 25.3 |
| SENSOR DIAGONAL LENGTH (mm) | 4.6 |
| θ1 (DEGREE) | 83.1 |
| θ2 (DEGREE) | 79.7 |
| t2/t1 | 2.32 |
| D1 (mm) | 1.67 |
| D2 (mm) | 3.02 |
| D2/D1 | 1.81 |

Fig. 6

IMAGING LENS UNIT

This is a Division of application Ser. No. 11/729,826 filed Mar. 30, 2007. The disclosure of the prior application is hereby incorporated by reference herein in its entirety.

BACKGROUND OF THE INVENTION

1. Field of the Invention

The present invention relates to an imaging lens unit. Particularly, the present invention relates to an imaging lens unit with a dual-lens configuration for capturing high-resolution images.

2. Description of Related Art

As image pickup devices demonstrate higher performance with a decrease in pixel size or the like, image pickup apparatus have smaller size and higher image quality. This creates a demand for smaller imaging lens units. For the achievement of higher image quality and smaller size, a triple-lens configuration has been used. The use of the triple-lens configuration enables the capture of high-quality images such as SXGA (1.3 megapixels) and UXGA (2.0 megapixels).

On the other hand, a dual-lens configuration is sometimes used for the purpose of size and cost reduction. However, dual-lens configurations of related arts are not suitable for capturing high-quality images, and they are only compatible with low-resolution imaging devices such as VGA (0.3 megapixels). Therefore, there is an increasing demand for development of megapixel dual lenses which are capable of capturing high-quality images.

The capture of higher-quality images can be achieved if ray is incident on an image pickup device at a more vertical angle. If ray is incident on an image pickup device more vertically, the ray can be effectively introduced to a photoelectric conversion device of the image pickup device, thereby creating better quality of images. One known approach is to place a microlens array on the front side of an image pickup device in order to reduce adverse effects caused by an oblique incidence to the image pickup device. Even with such an approach, however, a large angle of incident to an image pickup device hinders the creation of high-quality images. Thus, the development of a lens unit which approximates an angle of incident onto an image pickup device to a vertical angle is desired. The angle of incident refers to an angle between a normal to an incident surface and an incident ray. An angle of refraction, which is described later, refers to an angle between a normal to an incident surface and a refracted ray. If an incident surface is curved, a normal to a tangent plane at the point of incidence of ray is referred to as a normal to an incident surface.

The structure of using two meniscus lenses for an imaging lens as a dual-lens configuration with small aberration is proposed in Japanese Unexamined Patent Application Publication No. 2003-232990, for example. According to this technique, a first lens has a positive refractive power with a convex surface toward the object side, and a second lens has a positive refractive power with a convex surface toward the image side. Each lens has an aspherical surface on which aspherical correction has been made.

In order to reduce the size of image pickup apparatus, it is necessary to shorten an optical length in an imaging lens unit which is used in an image pickup apparatus. The optical length is a distance on an optical axis from the apex of a lens surface of the first lens on the object side to an image pickup surface. However, the optical length is long when ray from an object is incident on an image pickup device at a substantially vertical angle because the ray is applied to the image pickup surface substantially vertically. It has therefore been extremely difficult to both shorten the optical length and approximate the angle of incident of ray on an image pickup surface to a vertical angle.

The present invention has been accomplished to solve the above problems and an object of the present invention is thus to provide an imaging lens unit with a dual-lens configuration which has a short optical length, approximates an angle of incident of ray on an image pickup surface to a vertical angle, and corrects aberration to be small enough for the integration density of an image pickup device.

SUMMARY OF THE INVENTION

According to one aspect of the present invention, there is provided an imaging lens unit comprising, in order from the object side, a first lens having a meniscus shape with its convex surface on the object side, an aperture stop and a second lens having a meniscus shape with its convex surface on the image side. A maximal value of a tangent angle within a range of a lens surface effective diameter of the surface on the object side of the first lens is 70 to 90 degrees. A maximal value of a tangent angle within a range of a lens surface effective diameter of the surface on the image side of the second lens is 70 to 90 degrees.

In the above imaging lens unit, the maximal value of a tangent angle within a range of a lens surface effective diameter of the surface on the object side of the first lens is 75 to 90 degrees. Also, the maximal value of a tangent angle within a range of a lens surface effective diameter of the surface on the object side of the first lens is 80 to 90 degrees. Further, the maximal value of a tangent angle within a range of a lens surface effective diameter of the surface on the image side of the second lens is 75 to 90 degrees. Furthermore, the maximal value of a tangent angle within a range of a lens surface effective diameter of the surface on the image side of the second lens is 80 to 90 degrees. The optical length of the imaging lens unit is equal to or less than 5 mm.

According to the other aspect of the present invention, there is provided an imaging lens unit comprising, in order from the object side, a first lens having a meniscus shape with its convex surface on the object side, an aperture stop and a second lens having a meniscus shape with its convex surface on the image side. A ratio of thickness on an optical axis between the first lens and the second lens is 1.5 to 5.0. A ratio of lens surface effective diameters between the first lens and the second lens is 1.4 to 3.0.

In the above imaging lens unit, the ratio of thickness on an optical axis between the first lens and the second lens is 1.7 to 4.0. More preferably, the ratio of thickness on an optical axis between the first lens and the second lens is 2.0 to 3.0. The ratio of lens surface effective diameters between the first lens and the second lens is 1.5 to 2.5. The ratio of lens surface effective diameters between the first lens and the second lens is 1.6 to 2.0. Further, the optical length of the imaging lens unit is equal to or less than 5 mm.

According to the other aspect of the present invention, there is provided an imaging lens unit comprising, in order from the object side, a first lens having a meniscus shape with its convex surface on the object side, an aperture stop and a second lens having a meniscus shape with its convex surface on the image side. A maximal value of a tangent angle within a range of a lens surface effective diameter of the surface on the object side of the first lens is 70 to 90 degrees. A maximal value of a tangent angle within a range of a lens surface effective diameter of the surface on the image side of the second lens is 70 to 90 degrees. A ratio of thickness on an optical axis between the first lens and the second lens is 1.5 to 5.0.

In the above imaging lens unit, the maximal value of a tangent angle within a range of a lens surface effective diameter of the surface on the object side of the first lens is 75 to 90 degrees. The maximal value of a tangent angle within a range of a lens surface effective diameter of the surface on the object side of the first lens is 80 to 90 degrees. More preferably, the maximal value of a tangent angle within a range of a lens surface effective diameter of the surface on the image side of the second lens is 75 to 90 degrees. Further, the maximal value of a tangent angle within a range of a lens surface effective diameter of the surface on the image side of the second lens is 80 to 90 degrees. The ratio of thickness on an optical axis between the first lens and the second lens is 1.7 to 4.0. Further more, the ratio of thickness on an optical axis between the first lens and the second lens is 2.0 to 3.0.

According to the other aspect of the present invention, there is provided an imaging lens unit comprising, in order from the object side, a first lens having a meniscus shape with its convex surface on the object side, an aperture stop and a second lens having a meniscus shape with its convex surface on the object side image side. A maximal value of a tangent angle within a range of a lens surface effective diameter of the surface on the object side of the first lens is 70 to 90 degrees. A maximal value of a tangent angle within a range of a lens surface effective diameter of the surface on the image side of the second lens is 70 to 90 degrees. A ratio of lens surface effective diameters between the first lens and the second lens is 1.4 to 3.0.

In the above imaging lens unit, the maximal value of a tangent angle within a range of a lens surface effective diameter of the surface on the object side of the first lens is 75 to 90 degrees. The maximal value of a tangent angle within a range of a lens surface effective diameter of the surface on the object side of the first lens is 80 to 90 degrees. The maximal value of a tangent angle within a range of a lens surface effective diameter of the surface on the image side of the second lens is 75 to 90 degrees. Further, the ratio of lens surface effective diameters between the first lens and the second lens is 1.5 to 2.5. The ratio of lens surface effective diameters between the first lens and the second lens is 1.6 to 2.0. An ratio of thickness on an optical axis between the first lens and the second lens is 2.0 to 3.0.

According to the other aspect of the present invention, there is provided an imaging lens unit comprising, in order from the object side, a first lens having a meniscus shape with its convex surface on the object side and a second lens having a meniscus shape with its convex surface on the image side. A maximal value of a tangent angle within a range of a lens surface effective diameter of the surface on the object side of the first lens is 70 to 90 degrees. A maximal value of a tangent angle within a range of a lens surface effective diameter of the surface on the image side of the second lens is 70 to 90 degrees.

According to the other aspect of the present invention, there is provided an imaging lens unit comprising, in order from the object side, a first lens having a meniscus shape with its convex surface on the object side and a second lens having a meniscus shape with its convex surface on the image side. A ratio of thickness on an optical axis between the first lens and the second lens is 1.5 to 5.0. A ratio of lens surface effective diameters between the first lens and the second lens is 1.4 to 3.0.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWING

FIG. 4 shows lens data of a first lens according to an example;
FIG. 5 is a table showing aspherical surface coefficient in Equation 1 according to the example;
FIG. 6 is a table showing values of optical characteristics according to the example.

DESCRIPTION OF THE PREFERRED EMBODIMENTS

Figure 1:
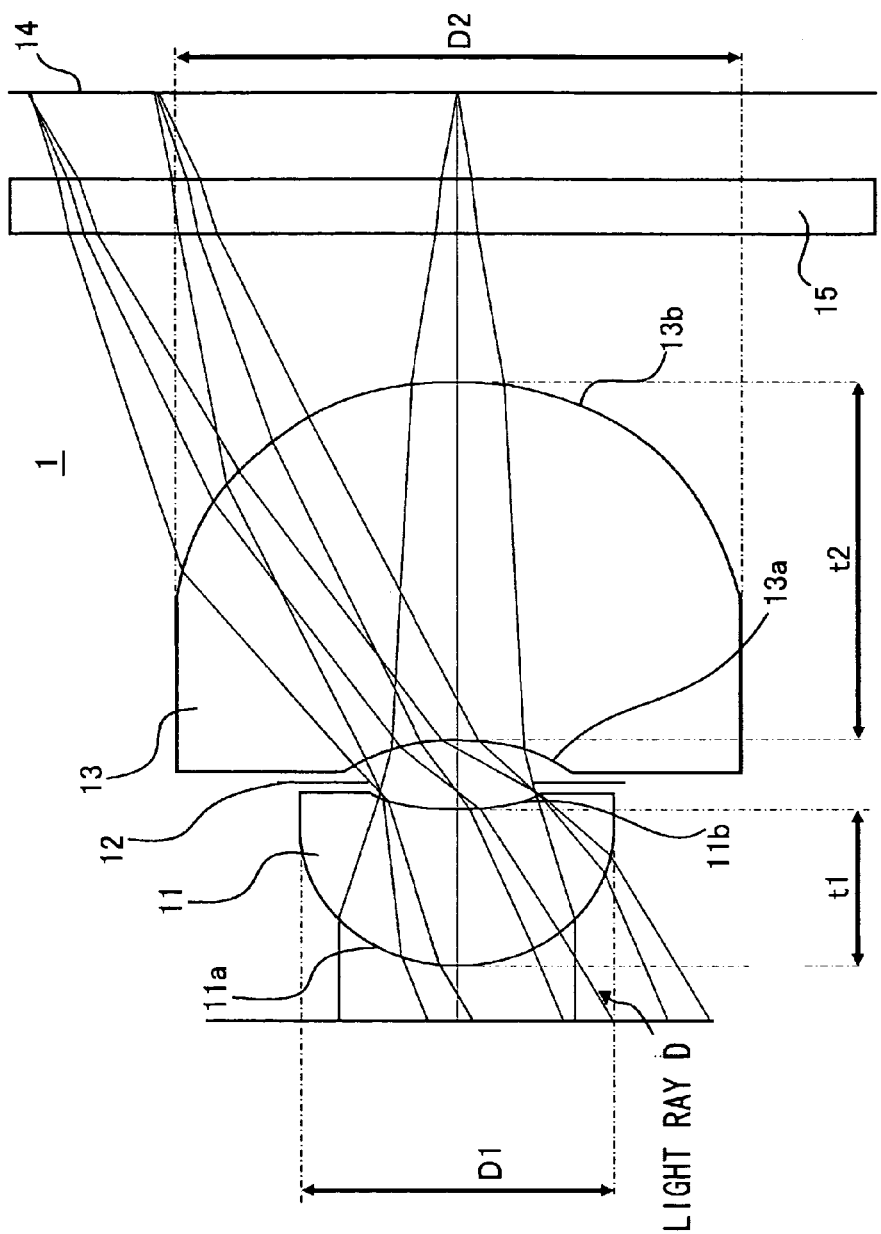
FIG. 1 is a view showing the structure of an imaging lens unit according to a first embodiment of the present invention.

An exemplary embodiment of the present invention is described hereinafter in detail with reference to the drawings. In the following embodiment, the present invention is applied to an imaging lens unit with a dual-lens configuration. The imaging lens unit of this embodiment includes a first lens, an aperture stop and a second lens, which are sequentially arranged in this order from the object side. On the lens surfaces of the first lens and the second lens, a maximal value of a tangent angle within an effective diameter range of a lens surface is designed to be 70 to 90 degrees. The tangent angle refers to an angle between a surface which is orthogonal to an optical axis and a tangent plane of a lens surface. The lens surface effective diameter is a range of a surface which optically functions as a lens. In an actual lens, an edge to retain a lens surface is formed in the periphery of the lens surface. When designing a lens, a lens surface which functions as a lens is normally extended by several tens to hundreds of um so as to allow for an assembly error, to obtain an image pick up range which is larger than the size of an imaging device, to assure a suitable peripheral light amount ratio, to assure a desired F-value or the like, and a lens edge is formed in its periphery. The lens surface effective diameter includes the extended portion. Thus, the lens surface effective diameter is substantially the same as the boundary between a lens surface and a lens edge. The lens surface effective diameter is different from an optical effective diameter, which is the diameter of a lens surface at the time of initial optical design without consideration of a manufacturing error, decentering, inclination, dimensional deviation and so on. Further, a lens surface may have a step discontinuity by being divided into loop zones or the like. In such a case, because incident ray to a step portion is not focused on an image pickup surface so that the portion does not optically function as a lens, a tangent angle for this portion is not taken into account. The imaging lens unit according to the present invention may be mounted on mobile phones and small digital cameras, for example.

The maximal value of the tangent angle within the range of the lens surface effective diameter on the lens surface of the first lens at the object side is set to 70 to 90 degrees, which allows the exit angle of the ray output from the first lens to be larger. The exit angle refers to an angle between a refracted ray on a lens surface and an optical axis of the lens. The ray thereby has a large exit angle, thus shortening an optical length. The maximal value of the tangent angle within the range of the lens surface effective diameter on the object-side lens surface of the first lens is preferably 75 to 90 degrees, and more preferably 80 to 90 degrees.

Further, the maximal value of the tangent angle within the range of the lens surface effective diameter on the lens surface of the second lens at the image side is set to 70 to 90 degrees, which allows the exit angle of the ray input from the first lens to be smaller. The ray having passed through the second lens thereby has a small exit angle, so that an angle of incident onto an image pickup surface gets closer to a vertical angle. The ray is thereby effectively introduced to a photoelectric conversion device of an image pickup device, thus creating a suitable image. It is thereby possible to capture high-quality images with an imaging lens unit having a dual-lens configuration with a short optical length. The maximal value of the tangent angle within the range of the lens surface effective diameter on the image-side lens surface of the second lens is preferably 75 to 90 degrees, and more preferably 80 to 90 degrees.

FIG. 1 shows the structure of an imaging lens unit according to this embodiment. An imaging lens unit 1 includes a first lens 11, an aperture stop 12 and a second lens 13, which are sequentially arranged in this order from the object side. According to need, the imaging lens unit 1 may also include a cover glass 15 between the second lens 13 and an image pickup surface 14. FIG. 1 illustrates the structure where the cover glass 15 is placed. A ray which is incident on the first lens 11 from the object side is refracted by the first lens 11 and passes through the aperture stop 12. The aperture stop 12 determines the amount of light to pass through the imaging lens unit 1. The ray having passed through the aperture stop 12 enters the second lens 13. The ray which is incident on the second lens 13 is refracted, transmitted through the cover glass 15 which protects an image pickup device, and focused on the image pickup surface 14. The cover glass 15 is used in order to prevent dust from being attached to the image pickup surface. It may further have a function as an optical filter such as an IR cut filter in order to prevent rays other than visible light from entering the image pickup device.

The first lens 11 is a meniscus lens of positive power which is convex toward the object side. The first lens 11 has an object-side lens surface 11a and an image-side lens surface 11b, at least one of which has an aspherical shape. The second lens 13 is a meniscus lens of positive power which is convex toward the image side. The second lens 13 has an object-side lens surface 13a and an image-side lens surface 13b, at least one of which has an aspherical shape. Although the first lens 11 and the second lens 13 are made of amorphous polyolefin resin by injection molding for its easiness of manufacturing, they may be made of other resins or optical glass for molding.

On the object-side lens surface 11a of the first lens 11 and the image-side lens surface 13b of the second lens 13 in the imaging lens unit of this embodiment, the maximal value of the tangent angle within the range of the lens surface effective diameter is 70 to 90 degrees. Because a tangent angle on the lens increases as it is farther from an optical axis, the tangent angle at the farthest position from the optical axis of the lens surface effective diameter of the lens is designed to be 70 and 90 degrees in the lens of this embodiment.

The maximal value of the tangent angle within the range of the lens surface effective diameter on the object-side lens surface 11a of the first lens 11 is set to 70 to 90 degrees, so that the ray has a large exit angle. Preferably, the maximal value of the tangent angle within the range of the lens surface effective diameter on the object-side lens surface 11a of the first lens 11 is set to 75 to 90 degrees. More preferably, the maximal value of the tangent angle within the range of the lens surface effective diameter on the object-side lens surface 11a of the first lens 11 is set to 80 to 90 degrees.

Figure 2:
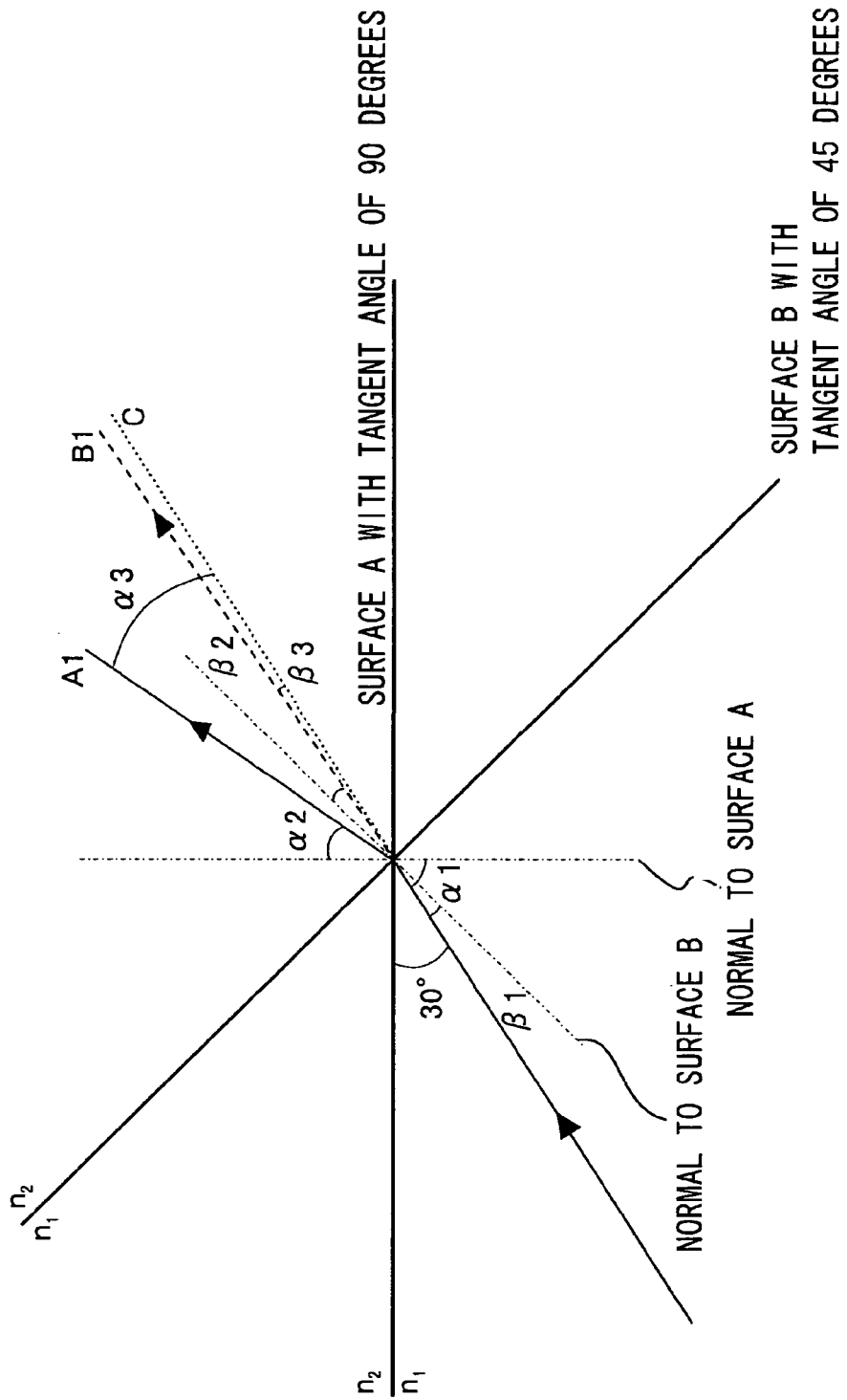
FIG. 2 is a view showing a change in the exit angle of incident ray on lens surfaces with different tangent angles.

FIG. 2 shows a change in the exit angle of incident rays on lens surfaces with different tangent angles. In this example, rays are incident on a surface A with a tangent angle of 90 degrees and a surface B with a tangent angle of 45 degrees. The symbol n1 indicates a refractive index of air, and n2 indicates a refractive index of a lens material, which satisfy n1<b2. Accordingly, the incident ray on the lens is refracted away from the lens surface by Snell's law.

In FIG. 2, a ray A1 which is refracted on the surface A with a tangent angle of 90 degrees is indicated by a full line, and a ray B1 which is refracted on the surface B with a tangent angle of 45 degrees is indicated by a broken line. The dotted line in FIG. 2 indicates an extended line from a ray which is incident on the surface A or B, which is a line C. The normal lines to the surfaces A and B are indicated by alternate long and short dashed lines.

As shown in FIG. 2, the ray A1 which is refracted on the surface A has a larger exit angle than the ray B1 which is refracted on the surface B. If n1=1, n2=1.5, an angle between an optical axis and an incident ray is 30 degrees, an angle of incident to the surface A is $\alpha 1$, and an angle of incident to the surface B is $\beta 1$, $\alpha 1=60$ degrees and $\beta 1=15$ degrees. If refractive angles $\alpha 2$ and $\beta 2$ on the surfaces A and B, respectively, are calculated according to Snell's law, $n1*\sin(\alpha 1)=n2*\sin(\alpha 2)$ and $\alpha 2=35.3$ degrees, and $\beta 2=9.9$ degrees. An angle $\alpha 3$ between the line C and the ray A1 is $\alpha 3=\alpha 1-\alpha 2=24.7$ degrees with reference to FIG. 2. Similarly, an angle $\beta 3$ between the line C and the ray B1 is $\beta 3=\beta 1-\beta 2=5.1$ degrees with reference to FIG. 2. Therefore, the exit angle on the surface A is larger than the exit angle on the surface B by 19.6 degrees. The lens having a surface with a larger tangent angle emits a ray with a larger exit angle.

Therefore, the first lens 11 of this embodiment has a tangent angle that its maximal value within the range of the lens surface effective diameter is 70 to 90 degrees, so that the tangent angle within the range of the lens surface effective diameter is large. Accordingly, the incident ray on the first lens 11 is output as a ray having a larger exit angle. The incident ray thereby has a large ray height at a short distance to the optical axis, thus shortening an optical length. The ray height is a distance from an optical axis in the vertical direction.

Figure 3:
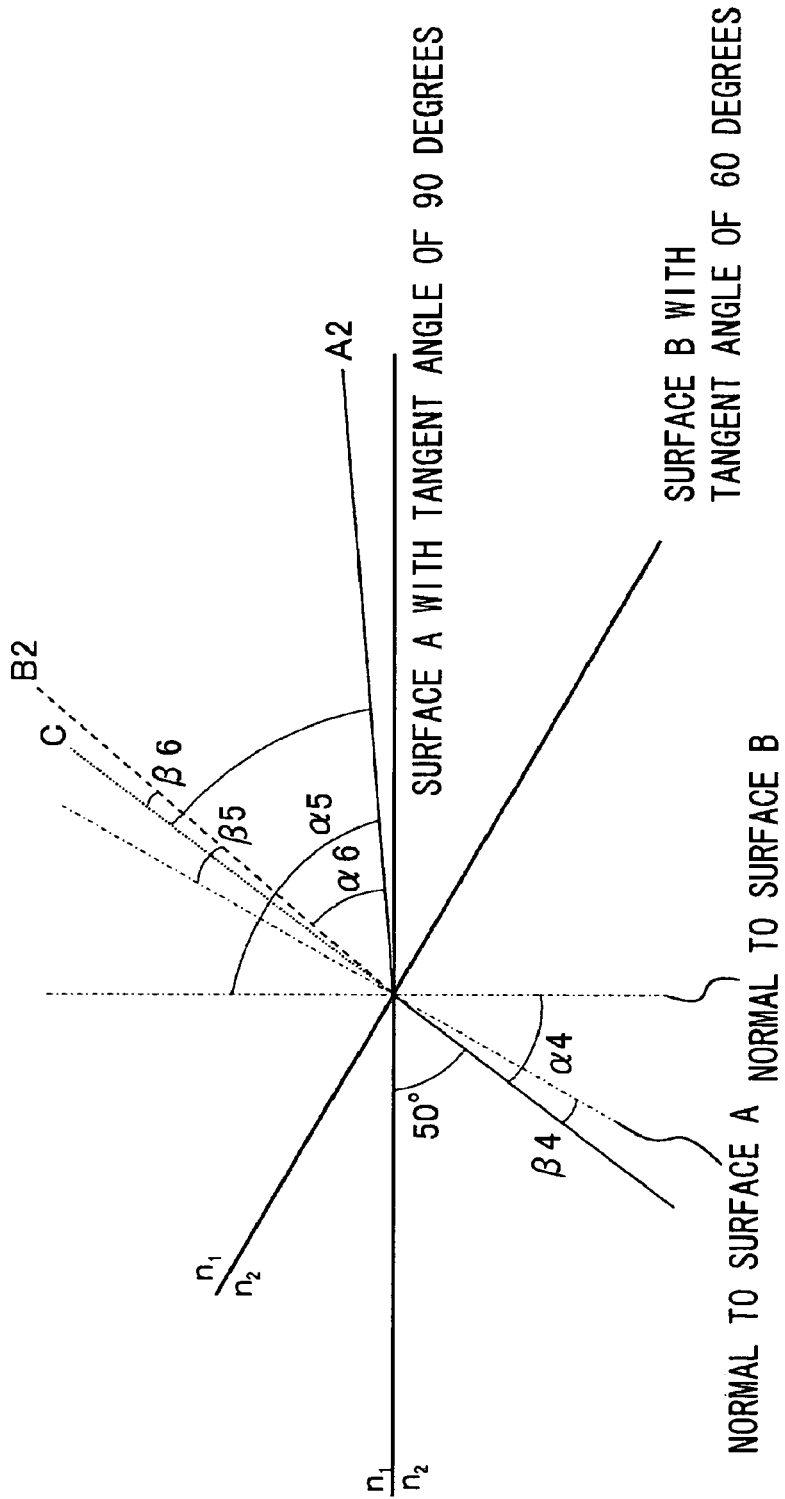
FIG. 3 is a view showing a change in the exit angle of output ray on lens surfaces with different tangent angles.

On the other hand, the maximal value of the tangent angle on the image-side lens surface 13b of the second lens 13 is set to 70 to 90 degrees according to this embodiment. The ray is thereby output from the second lens 13 as a ray having a smaller exit angle. FIG. 3 shows a change in the exit angle of output rays on lens surfaces with different tangent angles. In this example, rays are incident on a surface A with a tangent angle of 90 degrees and a surface B with a tangent angle of 60 degrees. The symbol n1 indicates a refractive index of air, and n2 indicates a refractive index of a lens material, which have the relationship of: n1<b2.

In FIG. 3, a ray A2 which is refracted on the surface A with a tangent angle of 90 degrees is indicated by a full line, and a ray B1 which is refracted on the surface B with a tangent angle of 60 degrees is indicated by a broken line. The dotted line in FIG. 3 indicates an extended line from a ray which is incident on the surface A or B, which is a line C. The normal lines to the surfaces A and B are indicated by alternate long and short dashed lines.

As shown in FIG. 3, the ray A1 which is refracted on the surface A has a smaller exit angle than the ray B1 which is refracted on the surface B. If n1=1, n2=1.5, an angle between an optical axis and an incident ray is 50 degrees, an angle of incident to the surface A is α4, and an angle of incident to the surface B is β4, α4=40 degrees and β4=10 degrees. If refractive angles α5 and β5 on the surfaces A and B, respectively, are calculated according to Snell's law, n2*sin(α4)=n1*sin(α5) and α5=74.6 degrees, and β5=15.1 degrees. An angle α6 between the line C and the ray A1 is α6=α5−α4=34.6 degrees with reference to FIG. 3. Similarly, an angle β6 between the line C and the ray B1 is β6=β5−β4=5.1 degrees with reference to FIG. 3. Therefore, the exit angle on the surface A is smaller than the exit angle on the surface B by 29.5 degrees. The lens having a surface with a larger tangent angle emits a ray with a smaller exit angle.

Therefore, the second lens 13 of this embodiment has a tangent angle that its maximal value within the range of the lens surface effective diameter is 70 to 90 degrees, so that the tangent angle within the range of the lens surface effective diameter is large. Preferably, the maximal value of the tangent angle within the range of the lens surface effective diameter on the image-side lens surface 13b of the second lens 13 is set to 75 to 90 degrees. More preferably, the maximal value of the tangent angle within the range of the lens surface effective diameter on the image-side lens surface 13b of the second lens 13 is set to 80 to 90 degrees. Accordingly, the incident ray to the second lens 13 is output as a ray having a smaller exit angle.

As described above, the ray which is incident on the first lens 11 is converted into a ray having a large exit angle, thereby shortening an optical length. The ray having the large exit angle is then converted by the second lens 13, so that it is incident on an image pickup surface at an angle closer to a vertical angle.

Referring to FIG. 1, the ray of the exit ray through the object-side lens surface 13a of the second lens 13 is such that the ray which propagates to a larger image height has a larger exit angle. The three rays which reach the position with an image height of 100% in FIG. 1 have substantially the same exit angle on the object-side lens surface 13a of the second lens 13. However, the exit angle of these rays on the image-side lens surface 13b is such that the ray which passes through the outermost part of the effective diameter of the second lens 13 is incident on the image pickup surface at the smallest angle, so that it can be focused on the image pickup surface 14. Therefore, the refractive angle of the ray which passes through the outermost part of the effective diameter of the second lens 13 on the lens surface 13b needs to be as large as possible. Thus, the lens of this embodiment is designed to have a large tangent angle at the outermost part of the lens surface effective diameter to thereby allow an angle of incident of ray on an image pickup surface to be small.

An optical length is shortened if a ray which is output from the first lens 11 has a large exit angle. Therefore, a tangent angle at the outermost part of the lens surface effective diameter of the first lens 11 is set to 70 to 90 degrees. In regard to a ray D which passes through the center of the aperture stop and reaches the position with an image height of 100%, it is necessary to approximate the position at which the ray D is incident on the lens surface 13b to the object side and also to increase an optical axis height in order to shorten an optical length and reduce an angle of incident to sensor. For this reason, an exit angle of the ray D on each lens surface is preferably as large as possible, which is achieved by increasing the exit angle on the lens surface 11a. On the other hand, in regard to the three rays which reach the position with an image height of 100%, because the lens surface 11a of the first lens 11 is convex toward the object side compared with the exit angle of the ray D, the exit angle of a ray which is incident on the outermost part of the lens surface 11a should be larger than the exit angle of the ray D. The angle of incident to sensor refers to an angle of incident of a chief ray which is incident on the image pickup device at the position with an image height of 100%, and the chief ray refers to a ray which passes through the center of the aperture stop.

The lens of this embodiment is designed such that a maximal value of a tangent angle within the range of the lens surface effective diameter on the object-side lens surface 11a of the first lens 11 is 70 to 90 degrees. The ray which enters the first lens 11 is thereby output as a ray having a large exit angle, which shortens the optical length in the imaging lens unit.

As described in the foregoing, the imaging lens unit 1 of this embodiment is configured such that a maximal value of a tangent angle within the range of a lens surface effective diameter on the object-side lens surface 11a of the first lens 11 and the image-side lens surface 13b of the second lens 13 is between 70 degrees and 90 degrees, thereby shortening an optical length and allowing ray to be incident on an image pickup surface at an angle close to a vertical angle. It is thereby possible to produce an imaging lens unit with a short optical length which is capable of capturing high-resolution images.

In the imaging lens unit of this embodiment, it is preferred that a thickness t1 of a first lens on an optical axis and a thickness t2 of a second lens on an optical axis satisfy the following conditional expression:

$$1.5 \leq t2/t1 \leq 5.0$$

Because the exit angle of the ray D on the lens surface 13a is larger than the exit angle of the ray D on the lens surface 13b, if the value of t2 is set larger, a ray height of the ray D on the lens surface 13b increases by approximating the lens surface 13b to the image side. This reduces an angle of incident to sensor of the ray which propagates to the position with an image height of 100%. The value of t1 is preferably small because an increase in the value of t1 causes an increase in optical length. Therefore, the ratio of thickness t2/t1 on an optical axis between the first lens and the second lens is set to be equal to or larger than 1.5 in this embodiment. Further, the first lens 11 needs to have a lens edge (not shown) in the periphery of its lens surface. If the lens edge is too thin, it reduces the easiness of molding and degrades the strength. Thus, due to the design limitation, the ratio t2/t1 of the thickness t1 of the first lens 11 on the optical axis and the thickness t2 of the second lens 13 on the optical axis is set to be equal to or smaller than 5.0. Preferably, the ratio t2/t1 of the thickness t1 of the first lens 11 on the optical axis and the thickness t2 of the second lens 13 on the optical axis is set to fall within the range of 1.7 to 4.0. More preferably, the ratio t2/t1 of the thickness t1 of the first lens 11 on the optical axis and the thickness t2 of the second lens 13 on the optical axis is set to fall within the range of 2.0 to 3.0.

Further, in the imaging lens unit of this embodiment, it is preferred that a diameter D1 of the lens surface effective diameter of the object-side lens surface of the first lens and a diameter D2 of the lens surface effective diameter of the image-side lens surface of the second lens satisfy the following conditional expression:

$$1.4 \leq D2/D1 \leq 3.0$$

The second lens is designed to be larger than the first lens because an angle of incident to sensor can be reduced if a ray having a large exit angle output from the first lens is incident on the lens surface 13b at the position where a ray height is as high as possible. The value of D1 is preferably small because an increase in the value of D1 causes an increase in the value of t1 to lead to a longer optical length. Therefore, the ratio D2/D1 of the diameters D1 and D2 of the lens surface effective diameters between the first lens and the second lens is set to be equal to or larger than 1.4 in this embodiment. Although the value t1 decreases as the value of D1 decreases, the reduction of t1 causes the reduction in thickness of a lens edge. Thus, due to the design limitation as described above, the ratio D2/D1 of the diameters D1 and D2 of the lens surface effective diameters between the first lens and the second lens is set to be equal to or smaller than 3.0. Preferably, the ratio D2/D1 of the diameters D1 and D2 of the lens surface effective diameters between the first lens and the second lens is set to fall within the range of 1.5 to 2.5. More preferably, the ratio D2/D1 of the diameters D1 and D2 of the lens surface effective diameters between the first lens and the second lens is set to fall within the range of 1.6 to 2.0.

An example of the present embodiment is described hereinafter. FIG. 4 shows lens data of the imaging lens unit according to this example. The four lens surfaces of the first lens and the second lens as the imaging lenses of this example have aspherical shapes, and the first lens and the second lens have positive power. Those surfaces are referred to, from the object side of the first lens, as a first surface, a second surface, an aperture stop, a fourth surface, a fifth surface, a sixth surface, and a seventh surface. The first surface and the second surface respectively express the object-side lens surface 11$a$ and the image-side lens surface 11$b$ of the first lens. The fourth surface and the fifth surface respectively express the object-side lens surface 13$a$ and the image-side lens surface 13$b$ of the second lens. The sixth surface and the seventh surface respectively express an object-side lens surface and an image-side lens surface of the cover glass 15, both having flat shape. The lens data of FIG. 4 show the curvature radius, surface interval, refractive index and Abbe number of each surface.

The aspherical shape of each lens surface of the first lens and the second lens, which is designed based on the lens data of FIG. 4, is expressed by the following aspherical equation:

Expression 1:

$$z = \frac{ch^2}{1 + \sqrt{1-(1+k)c^2h^2}} + \sum_{i=2}^{8} A_{2i} h^{2i} \quad (1)$$

In Expression 1, z indicates a sag, c indicates a curvature of a lens surface on an optical axis, K indicates a constant of the cone, A4, A6, A8, A10, A12, A14 and A16 indicate the 4th-order to 16th-order coefficients of aspherical surfaces, respectively. The curvature c and the curvature radius R have the relationship of: c=1/R. The sag is a distance from a tangent plane at a coordinate point on a lens at which a ray height is h and on a lens surface in an optical axis.

FIG. 5 shows the coefficients of aspherical surfaces of the lenses in Expression 1 according to this example. FIG. 6 shows values of optical characteristics according to this example. The values are a focal length f, an F-number, an optical length, a back focus, a diagonal angle of view, an angle of incident to sensor, a sensor diagonal length, tangent angles θ1 and θ2, a ratio t2/t1, D1, D2, and a ratio D2/D1. The F-number is a result of division of a lens focal length by an entrance pupil diameter. The back focus is a distance from the apex of the image-side lens surface of the second lens to the image pickup surface. The diagonal angle of view indicates a maximal angle of an object at which an image can be captured diagonally with respect to an image pickup device.

The value θ1 indicates a maximal value of a tangent angle of the first lens, and θ2 indicates a maximal value of a tangent angle of the second lens. The values t1 and t2 indicate the thicknesses of the first lens and the second lens, respectively, on the optical axis. The values D1 and D2 indicate the lens surface effective diameters of the object-side lens surface of the first lens and the image-side lens surface of the second lens, respectively. The conditional expressions on the tangent angle, the thickness on the optical axis and the lens surface effective diameter in the above-described embodiment are thus satisfied.

Figures 7A, 7B, 7C:
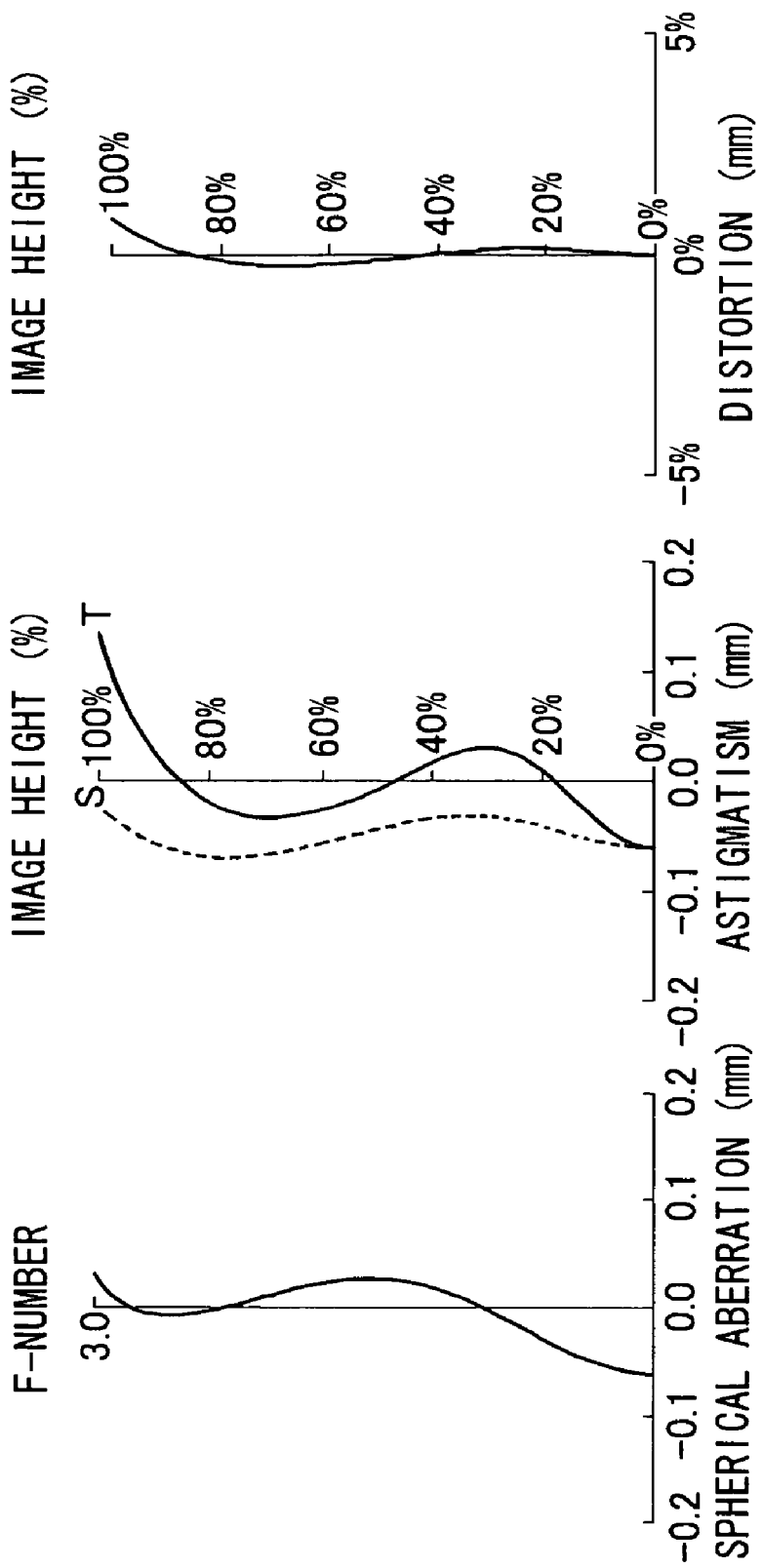
FIGS. 7A to 7C are aberration charts showing several kinds of aberrations in an imaging lens unit.

FIGS. 7A to 7C show aberrations in the imaging lens unit according to the above-described embodiment. FIG. 7A is a spherical aberration chart. The vertical axis indicates F-number where a maximal value is F-number 3.0, and the horizontal axis indicates spherical aberration. FIG. 7B is an astigmatism chart. The vertical axis indicates a percentage with respect to a distance of an image height from an optical axis, and the horizontal axis indicates astigmatism. FIG. 7C is a distortion chart. The vertical axis indicates a percentage with respect to a distance of an image height from an optical axis as in the astigmatism chart, and the horizontal axis indicates distortion. In FIG. 7B, T indicates a tangential image surface, and S indicates a sagittal image surface.

The spherical aberration is as small as 0.05 mm at maximum. The astigmatism is as small as 0.08 mm at maximum at an image height of 80%. The distortion is as small as close to 0% for substantially all image heights.

These charts show that the imaging lens unit of this embodiment has small aberrations. The imaging lens unit of this embodiment also has a shorter optical length, which is 4.73 mm.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An imaging lens unit comprising, in order from the object side:
   a first lens having a meniscus shape with its convex surface on the object side; and
   a second lens having a meniscus shape with its convex surface on the image side, wherein
   a maximal value of a tangent angle within a range of a lens surface effective diameter of the surface on the object side of the first lens is 70 to 90 degrees,
   a maximal value of a tangent angle within a range of a lens surface effective diameter of the surface on the image side of the second lens is 70 to 90 degrees and
   the optical length of the imaging lens unit is equal to or less than 5 mm.

2. An imaging lens unit according to claim 1, wherein the ratio of thickness on an optical axis between the first lens and the second lens is 1.5 to 5.0.

3. An imaging lens unit according to claim 1, wherein the ratio of lens surface effective diameters between the first lens and the second lens is 1.4 to 3.0.

4. A personal digital assistant comprising an imaging lens unit according to claim 1.

5. An imaging lens unit comprising, in order from the object side:

a first lens having a meniscus shape with its convex surface on the object side; and a second lens having a meniscus shape with its convex surface on the image side, wherein a maximal value of a tangent angle within a range of a lens surface effective diameter of the surface on the object side of the first lens is 70 to 90 degrees, a ratio of thickness on an optical axis between the first lens and the second lens is 1.5 to 5.0, and the optical length of the imaging lens unit is equal to or less than 5 mm.

6. An imaging lens unit according to claim 5, wherein the ratio of lens surface effective diameters between the first lens and the second lens is 1.4 to 3.0.

7. An imaging lens unit according to claim 5, wherein the maximal value of a tangent angle within a range of a lens surface effective diameter of the surface on the object side of the first lens is 75 to 90 degrees.

8. An imaging lens unit according to claim 5, wherein the maximal value of a tangent angle within a range of a lens surface effective diameter of the surface on the object side of the first lens is 80 to 90 degrees.

9. A personal digital assistant comprising an imaging lens unit according to claim 5.

10. An imaging lens unit comprising, in order from the object side;

a first lens having a meniscus shape with its convex surface on the object side; and a second lens having a meniscus shape with its convex surface on the image side, wherein a maximal value of a tangent angle within a range of a lens surface effective diameter of the surface on the object side of the first lens is 70 to 90 degrees, a ratio of lens surface effective diameters between the first lens and the second lens is 1.4 to 3.0, and the optical length of the imaging lens unit is equal to or less than 5 mm.

11. An imaging lens unit according to claim 10, wherein the maximal value of a tangent angle within a range of a lens surface effective diameter of the surface on the image side of the second lens is 70 to 90 degrees.

12. An imaging lens unit according to claim 10, wherein the maximal value of a tangent angle within a range of a lens surface effective diameter of the surface on the object side of the first lens is 75 to 90 degrees.

13. An imaging lens unit according to claim 10, wherein the maximal value of a tangent angle within a range of a lens surface effective diameter of the surface on the object side of the first lens is 80 to 90 degrees.

14. A personal digital assistant comprising an imaging lens unit according to claim 10.

15. An imaging lens unit comprising, in order from the object side:

a first lens having a meniscus shape with its convex surface on the object side; and a second lens having a meniscus shape with its convex surface on the image side, wherein a maximal value of a tangent angle within a range of a lens surface effective diameter of the surface on the object side of the second lens is 70 to 90 degrees, a ratio of thickness on an optical axis between the first lens and the second lens is 1.5 to 5.0, and the optical length of the imaging lens unit is equal to or less than 5 mm.

16. An imaging lens unit according to claim 15, wherein the maximal value of a tangent angle within a range of a lens surface effective diameter of the surface on the object side of the first lens is 70 to 90 degrees.

17. An imaging lens unit according to claim 15, wherein the maximal value of a tangent angle within a range of a lens surface effective diameter of the surface on the image side of the second lens is 75 to 90 degrees.

18. An imaging lens unit according to claim 15, wherein the maximal value of a tangent angle within a range of a lens surface effective diameter of the surface on the image side of the second lens is 80 to 90 degrees.

19. A personal digital assistant comprising an imaging lens unit according to claim 15.

20. An imaging lens unit comprising, in order from the object side:

a first lens having a meniscus shape with its convex surface on the object side; and a second lens having a meniscus shape with its convex surface on the image side, wherein a maximal value of a tangent angle within a range of a lens surface effective diameter of the surface on the object side of the second lens is 70 to 90 degrees, a ratio of lens surface effective diameters between the first lens and the second lens is 1.4 to 3.0, and the optical length of the imaging lens unit is equal to or less than 5 mm.

21. An imaging lens unit according to claim 20, wherein the ratio of thickness on an optical axis between the first lens and the second lens is 1.5 to 5.0.

22. An imaging lens unit according to claim 20, wherein the maximal value of a tangent angle within a range of a lens surface effective diameter of the surface on the image side of the second lens is 75 to 90 degrees.

23. An imaging lens unit according to claim 20, wherein the maximal value of a tangent angle within a range of a lens surface effective diameter of the surface on the image side of the second lens is 80 to 90 degrees.

24. A personal digital assistant comprising an imaging lens unit according to claim 20.

* * * * *